United States Patent
Yoshida et al.

(10) Patent No.: US 7,287,860 B2
(45) Date of Patent: Oct. 30, 2007

(54) DISPLAY DEVICE, DISPLAY METHOD, AND PROJECTOR

(75) Inventors: Shohei Yoshida, Nagano-ken (JP); Hidehito Iisaka, Shiojiri (JP); Hidefumi Sakata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 207 days.

(21) Appl. No.: 10/826,387

(22) Filed: Apr. 19, 2004

(65) Prior Publication Data

US 2005/0007390 A1 Jan. 13, 2005

(30) Foreign Application Priority Data

May 6, 2003 (JP) ............................ 2003-128123

(51) Int. Cl.
*G03B 21/44* (2006.01)
(52) U.S. Cl. ............................... 353/31; 353/84; 349/5
(58) Field of Classification Search .................. 353/31, 353/33, 34, 37, 84, 94; 349/5, 7, 61, 67; 348/742, 743, 771, 750, 751, 759, 760, 761; 362/555, 231, 800
See application file for complete search history.

(56) References Cited

U.S. PATENT DOCUMENTS

| | | | |
|---|---|---|---|
| 6,042,234 A | | 3/2000 | Itoh |
| 6,224,216 B1* | | 5/2001 | Parker et al. ................. 353/31 |
| 6,330,039 B2* | | 12/2001 | Matsui et al. ................ 348/742 |
| 6,547,400 B1* | | 4/2003 | Yokoyama ................... 353/98 |
| 6,726,333 B2* | | 4/2004 | Huibers et al. ............... 353/84 |
| 6,769,772 B2* | | 8/2004 | Roddy et al. ................ 353/31 |
| 6,869,190 B2* | | 3/2005 | Goto et al. .................. 353/85 |
| 6,882,379 B1* | | 4/2005 | Yokoyama et al. ........... 349/61 |
| 6,939,027 B2* | | 9/2005 | Harumoto ................... 362/336 |
| 7,029,129 B2* | | 4/2006 | Shimada ..................... 353/94 |
| 7,052,138 B2* | | 5/2006 | Matsui ........................ 353/31 |
| 2002/0135553 A1* | | 9/2002 | Nagai et al. ................. 345/89 |
| 2003/0086265 A1 | | 5/2003 | Ilsala et al. |
| 2003/0090900 A1* | | 5/2003 | Kim et al. ................... 362/231 |
| 2003/0227577 A1* | | 12/2003 | Allen et al. ................. 348/742 |
| 2004/0008288 A1* | | 1/2004 | Pate et al. ................... 348/742 |

(Continued)

FOREIGN PATENT DOCUMENTS

CN 1228544 A 9/1999

(Continued)

OTHER PUBLICATIONS

Ohama et al. "Concept and Technologies of Natural Vision system", Invited Address—2, IDW '02, pp. 11-14.

(Continued)

*Primary Examiner*—William C. Dowling
(74) *Attorney, Agent, or Firm*—Oliff & Berridge, PLC

(57) ABSTRACT

The invention provides a display device and a projector that can improve display performance with a simple structure without accompanying the enlargement of the device. The display device of the invention can include an illumination system capable of outputting a plurality of primary color light components having different luminescent colors and liquid crystal light valves for modulating the primary color light components output from the illumination system, and the illumination system can adjust the emission spectra of the primary color light components. A light-emitting device of each light controls outputs therefrom independently.

8 Claims, 13 Drawing Sheets

U.S. PATENT DOCUMENTS

| | | | |
|---|---|---|---|
| 2004/0070736 A1* | 4/2004 | Roddy et al. | 353/31 |
| 2005/0088625 A1* | 4/2005 | Imade | 353/31 |
| 2005/0122486 A1* | 6/2005 | Trollsch | 353/94 |

FOREIGN PATENT DOCUMENTS

| | | |
|---|---|---|
| CN | 1273641 A | 11/2000 |
| CN | 1349124 A | 5/2002 |
| JP | A 2000-338950 | 12/2000 |
| JP | A 2002-023259 | 1/2002 |
| JP | A 2002-140038 | 5/2002 |
| JP | A 2003-107472 | 4/2003 |
| JP | A 2003-121926 | 4/2003 |

OTHER PUBLICATIONS

Hiyama et al. 122%-NTSC Color Gamut 15-in TFT-LCD Using 4-primary Color LED Backlighting and Field Sequential, AMD1/FMC2-4, IDW '02, pp. 215-218.

* cited by examiner

DISPLAY DEVICE, DISPLAY METHOD, AND PROJECTOR

BACKGROUND OF THE INVENTION

1. Field of Invention

The present invention relates to a display device, a display method, and a projector.

2. Description of Related Art

Recently, a projection display device capable of displaying colors has been practically used and has a typical configuration using an additive mixture of colors of three primary colors, such as red (R), green (G), and blue (B). For example, it is well known that a light source having three primary colors, such as red (R), green (G), and blue (B), projects primary color light components onto light modulation devices, the light modulation device modulates the projected primary color light components, and light components transmitted through the light modulation devices are overlapped, thereby an image is displayed. A color display device having a related configuration selects the three primary colors so that the area of the color gamut is largest. However, there is a limitation to the reproduction gamut of the three primary colors, and the color gamut that a user can sense is wider than the area of the color gamut. Accordingly, in order to improve imaging performance of the color display device by enlarging the color gamut, a color display device having multiple primary colors in which the number of primary colors is increased by four or more primary colors, has been proposed. See, for example, Japanese Unexamined Patent Application Publication No. 2000-338950, "Concept and Technologies of Natural Vision System", InvitedAddress-2, IDW'02, p11-14, and "122%-NTSC Color Gamut 15-in. TFT-LCD Using 4-Primary Color LED Backlighting and Field Sequential", AMDI/FMC2-4, IDW'02, p215-218.

SUMMARY OF THE INVENTION

An increase in primary color light is sought using technologies described above, and it is possible to enlarge the color reproduction gamut of a display device. However, in order to obtain illumination light having four primary colors, the size of a color separation system or an illumination system, such as a light source, needs to be large. Accordingly, the size of a device inevitably becomes large, and the manufacturing cost thereof inevitably increases.

It is an object of the invention to provide a display device and a projector that can improve imaging performance with a simple structure without accompanying the expansion of the device volume.

Further, it is another object of the present invention to provide a display method that is applied to display devices and thus imaging performance of the corresponding device can be improved.

In order to achieve the above-mentioned objects, the invention can be characterized by a display device having an illumination device capable of outputting a plurality of primary color light components having different luminescent colors and a light modulation device which modulates the primary color light components output from the illumination device. The illumination device can adjust the emission spectra of the primary color light components.

According to this configuration, since the color reproduction gamut (the color gamut) composed of primary color light components incident on the light modulation device is changed by adjustment of the emission spectra of the primary color light components, display of an image can be performed while the color gamut is changed, so that the color reproduction gamut can be substantially enlarged and a display device having excellent imaging performance can be obtained without increasing the number of primary colors.

In the display device according to the invention, preferably, the illumination device can include a plurality of light sources having different luminescent colors, and each of the light sources includes a plurality of light-emitting devices capable of independently adjusting the outputs (each intensity) therefrom.

According to this configuration, the output states of the plurality of light-emitting devices are freely controlled, so that the emission spectra of the primary color light components output from the light source can be freely adjusted. Accordingly, a display device having a simple structure and excellent imaging performance can be provided.

In the display device according to the invention, preferably, a color filter having a plurality of transmission spectra corresponding to the primary color light components output from the respective light sources is provided between the illumination means and the light modulation device, and the adjustment range of the emission spectrum of each of the light sources is within the range of the transmission spectrum of the color filter.

According to this configuration, in the display device for making light transmitted through a color filter and making the primary color light selectively incident on the light modulation device, when adjustment of the emission spectrum is performed, even though the output states of the light-emitting devices are changed, primary color light that exceeds the range of the transmission spectrum (the transmissive wavelength region) of the color filter is not incident on the color filter. Accordingly, imaging performance can be improved using an expansion effect of the color gamut by adjustment of the irradiation spectrum.

In the display device according to the invention, preferably, a plurality of the light modulation device can be provided to correspond to each of the plurality of light sources, and the display device can further include a color composition device for compositing the primary color light components output from the light modulation means. The adjustment range of the emission spectrum of each of the light sources is within the range of the transmission spectrum of the color composition device.

According to this configuration, in the display device for compositing primary color light components output from the light modulation device and generating a displayed image, when adjustment of the emission spectrum is performed, even though the output states of the light-emitting devices are changed, primary color light that exceeds the range of the transmission spectrum (transmission wavelength range) of the color composition device is not incident on the color composition device. Accordingly, display performance can be improved using an enlargement effect of the color gamut by adjustment of the emission spectrum.

In the display device according to the invention, preferably, the illumination device can include a light source and a color separation device for separating output light from the light source into a plurality of primary color light components, a plurality of light modulation device can be provided to correspond to the respective primary color light components, and a color composition device for compositing the primary color light components output from the respective light modulation device can be provided, and the light source can adjust the emission spectrum of each primary color light component included in the output light within the range of the transmission spectra of the color separation device and the color composition device.

According to this configuration, in the display device for separating light output from the light source into a plurality of primary color light components to be incident on the plurality of light modulation device and for compositing primary color light components emitted from the light modulation device to generate a displayed image, when adjustment of the emission spectrum is performed, even though the output states of the light-emitting devices are changed, primary color light that exceeds the range of the transmission spectra (the transmission wavelength range) of the color separation device and the color composition device is not incident on the color separation device and the color composition device. Accordingly, display performance can be improved using an enlargement effect of the color gamut by adjustment of the emission spectrum.

In the display device according to the invention, preferably, the illumination device can include a light source and band controlling device for adjusting the emission spectrum of light output from the light source and emitted to the light modulation device.

According to this configuration, since the emission spectrum of the primary color light output from the light source and incident on the light modulation device can be controlled by the band controlling device, display of an image can be performed while the color gamut is changed, so that the color reproduction gamut can be substantially enlarged and a display device having excellent video representation performance can be obtained.

In the display device according to the invention, the band controlling device freely adjusts the transmission spectrum within a predetermined range. According to this configuration, the emission spectrum of the primary color light transmitted through the band controlling device can be freely adjusted within a predetermined band, display of an image can be performed while the color gamut of the display device is changed, so that the color reproduction gamut can be substantially enlarged and a display device having excellent display performance can be obtained.

In the display device according to the invention, preferably, the band controlling device freely converts the plurality of transmission spectra. According to this configuration, since the transmission spectrum of the band controlling device can be shifted and the emission spectrum of the primary color light incident on the light modulation device can be adjusted, display of an image can be performed while the color gamut of the display device is changed, so that the color reproduction gamut can be substantially enlarged and a display device having excellent display performance can be obtained.

In the display device according to the invention, preferably, the display device can further include image analysis device which outputs a light control signal for adjusting the emission spectra of the primary color light components based on an image signal of a displayed image supplied to the light modulation device, and light controlling device which adjusts the emission spectra of the primary color light components based on the light control signal.

According to this configuration, the image signal of the displayed image is analyzed using the image analysis device, the transmission band of the band controlling device is controlled based on a related analysis result. Thus adjusting the emission spectrum of the primary color light, thereby obtaining a display device having excellent video representation performance in which the color gamut is automatically changed according to a displayed image.

In the display device according to the invention, preferably, an image analysis device outputs a band control signal for adjusting the emission spectra of the primary color light components based on an image signal of the displayed image supplied to the light modulation device, and the band controlling device adjusts the emission spectra of the primary color light components based on the band control signal.

According to this configuration, the image signal of the displayed image is analyzed using the image analysis device, the transmission band of the band controlling device is controlled based on the analysis result. Thus adjusting the emission spectrum of the primary color light, thereby obtaining a display device having excellent display performance in which the color gamut is automatically changed according to a displayed image.

The display device according to the invention can further include a chromaticity correction device for correcting the white balance of the light output from the illumination means when adjustment of the emission spectra of the primary color light components is performed. According to this configuration, since the emission spectrum of the primary color light is adjusted and a difference in white balance accompanied by changing the color gamut formed by the plurality of primary color light components is automatically corrected, the color reproduction gamut can be enlarged while a color change is suppressed, thereby obtaining display with a high image quality.

In the display device according to the invention, preferably, the chromaticity correction device corrects the white balance in the low saturation region of the light output from the illumination means. According to this configuration, since the chromaticity correction device performs correction of white balance in the low saturation region in which color variation is easily noticed, processing using the chromaticity correction device can be reduced, and display in which color variation is effectively suppressed can be obtained.

Next, in a display method applicable to a display device having an illumination device capable of outputting a plurality of primary color light components having different luminescent colors and a light modulation device which modulates the primary color light components output from the illumination device, the emission spectra of the primary color light components output from the illumination device is adjusted according to the contents of a displayed image supplied to the light modulation device.

According to this method, since the color gamut composed of primary color light components incident on the light modulation device is modified by adjustment of the emission spectra of the primary color light components, display of an image can be performed while the color gamut is modified, so that the color gamut can be substantially enlarged and a display with excellent imaging performance can be obtained without increasing the number of primary colors.

Next, the invention can provide a projector having a display device according to any one of the aforementioned display devices according to the invention and a projection device for projecting light modulated by the light modulation means. According to this configuration, display of an image can be performed while the color gamut is modified, the color gamut can be substantially enlarged and a display with excellent imaging performance can be obtained without increasing the number of primary colors.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Hereinafter, preferred embodiments of the present invention will be described in detail with reference to the accompanying drawings. For the purpose of understanding the drawings, the dimension or size of each portion is properly different in each of the drawings that will be referenced below.

Figure 1:
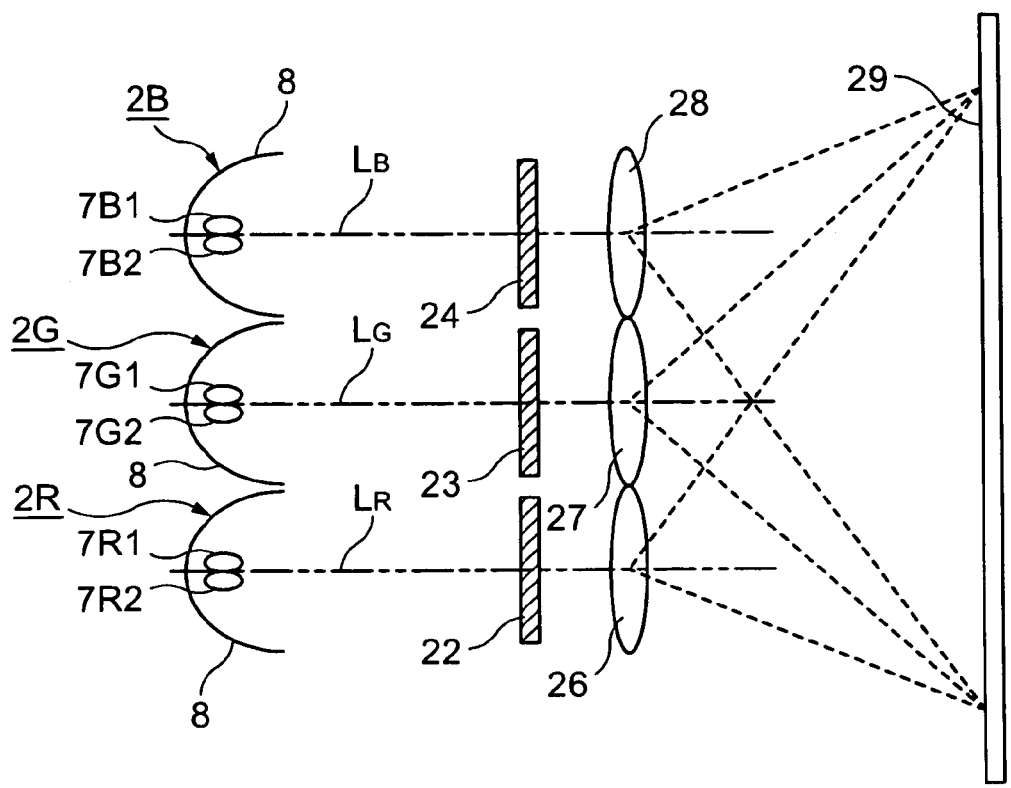
FIG. 1 schematically illustrates the structure of a projection display device according to a first embodiment of the present invention.

FIG. 1 schematically illustrates the structure of a projection display device according to a first embodiment of the invention. The projection display device of FIG. 1 includes an illumination system (illumination means) having light sources 2R, 2G, and 2B capable of emitting primary color light having different emitted colors, liquid crystal light valves (light modulation device) 22 to 24, and projection devices 26 to 28. Reference numeral 29 denotes a screen onto which an image is projected.

The light source 2R for emitting red light (primary color light) LR includes two light-emitting devices 7R1 and 7R2 and a reflector 8 for reflecting light of the light-emitting devices 7R1 and 7R2. The light source 2G for emitting green light (primary color light) LG includes two light-emitting devices 7G1 and 7G2 and a reflector 8 for reflecting light of the light-emitting devices 7G1 and 7G2. The light source 2B for emitting blue light (primary color light) LB includes two light-emitting devices 7B1 and 7B2 and a reflector 8 for reflecting light of the light-emitting devices 7B1 and 7B2. The light-emitting devices 7R1, 7R2, 7G1, 7G2, 7B1, and 7B2 have different emission spectrum, and are configured to control outputs therefrom independently. A light emitting diode (LED) or an EL device may be used as a light-emitting device of the light sources 2R, 2G, and 2B.

Light sources 2R, 2G, and 2B are provided to correspond to liquid crystal light valves (light modulation device 22, 23, and 24.

Red light LR emitted from the light source 2R is incident on the liquid crystal light valve 22 for red light and is then modulated by the liquid crystal light valve 22 for red light. The green light LG emitted from the light source 2G is incident on the liquid crystal light valve 23 for green light and is then modulated by the liquid crystal light valve 23 for green light. The blue light LB emitted from the light source 2B is incident on the liquid crystal light valve 24 for blue light and is then modulated by the liquid crystal light valve 24 for blue light. In addition, a light control driver (not shown) is connected to each of the light sources 2R, 2G, and 2B. The light control driver is adapted to be capable of adjusting the emission spectrum of primary color light emitted from each of the light sources 2R, 2G, and 2B.

The three primary colors modulated by the liquid crystal light valves 22, 23, and 24 are incident on each of the projection devices 26 to 28, are projected onto the screen 29, forming an enlarged image on the screen 29.

Figure 2:
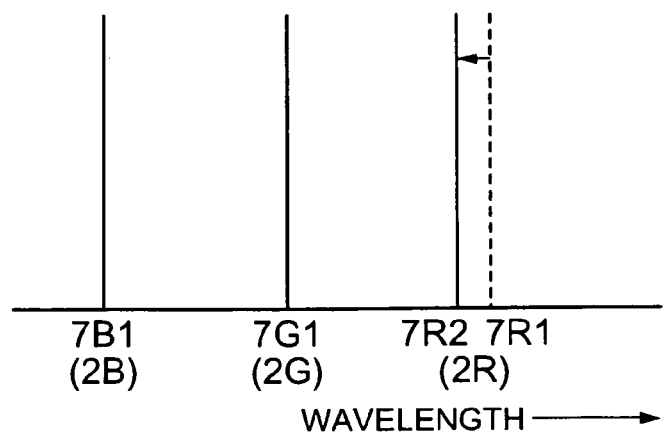
FIG. 2 illustrates a function of a projection display device according to an embodiment of the present invention.
Figure 3:
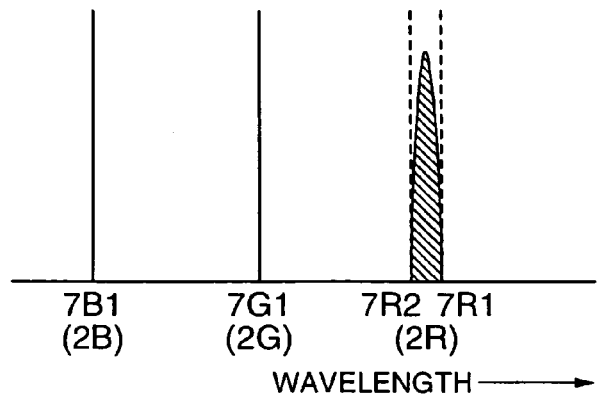
FIG. 3 illustrates a function of a projection display device according to an embodiment of the present invention.

FIGS. 2 and 3, respectively, illustrate the function of the projection display device according to the embodiment. An axis of abscissa represents an emission wavelength, and an axis of ordinate conceptually represents emission intensity. FIG. 2 illustrates a variation in emission spectrum (shift of emission wavelength) when the light source 2R performs conversion from the light-emitting device 7R1 into the light-emitting device 7R2, together with the emission spectra of the respective light sources 2R, 2G, and 2B. FIG. 3 illustrates a variation in emission spectra (making the band width of an emission wavelength region wide) when the light source 2R adjusts outputs from the two light-emitting devices 7R1 and 7R2.

As shown in FIGS. 2 and 3, the projection display device according to the embodiment controls the emitting states of two light-emitting devices disposed in the respective light sources 2R, 2G, and 2B, so that the emission spectrum of primary color light output from each light source is adjusted, thereby adjusting the color gamut of the projection display device.

An image-processing unit (not shown in FIG. 1) which performs predetermined image processing on each primary color light, is connected to each of the liquid crystal light valves 22 to 24, and image signals on which predetermined image processing is performed by the image-processing unit, via a light valve driver, and are supplied to each of the liquid crystal light valves 22 to 24. In addition, an image analysis unit (not shown) is connected to the respective light sources 2R, 2G, and 2B via a light control driver. Based on the analysis of the image signals using the image analysis unit, the emission spectrum of primary color light output from the respective light sources 2R, 2G, and 2B can be controlled. In other words, the projection display device according to the present embodiment freely adjusts the color reproduction gamut of the projection display device based on image processing performed by the image-processing unit and light control performed by the image analysis unit and the light control driver, thereby performing adjustment of a displayed image.

Figure 4:
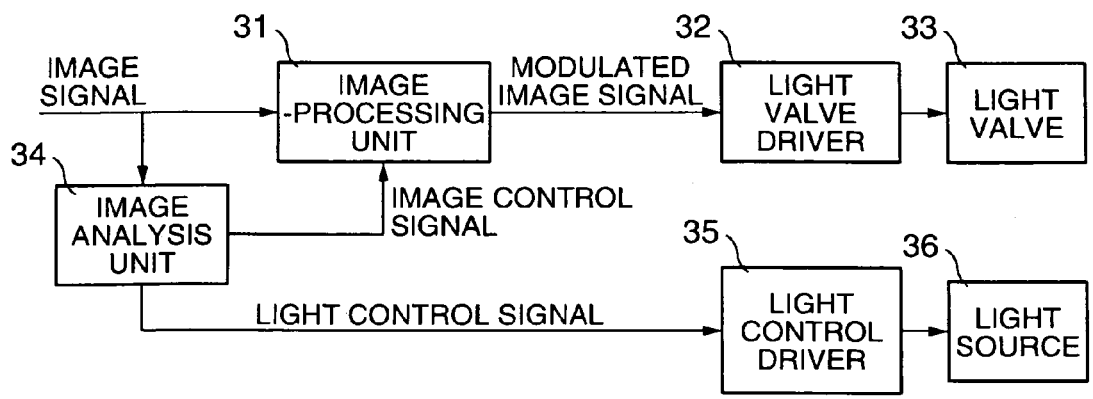
FIG. 4 is an exemplary block diagram illustrating a driving circuit according to an embodiment of the present invention.

FIG. 4 is an exemplary block diagram illustrating a driving circuit of the projection display device according to the embodiment. The driving circuit of FIG. 4 includes an image-processing unit 31 and an image analysis unit 34. A light valve 33 (liquid crystal light valves 22 to 24 of FIG. 1) is connected to the image-processing unit 31 via a light valve driver 32, and a light source 36 (light sources 2R, 2G, and 2B of FIG. 1) is connected to the image analysis unit 34 via a light control driver 35. In addition, the image analysis unit 34 and the image-processing unit 31 are connected to each other.

First, image signals supplied to the driving circuit are inputted to the image-processing unit 31 and the image analysis unit 34. The image analysis unit 34 performs analysis of the image signals, derives image-processing parameters used in image processing performed by the image-processing unit 31, and supplies the image-processing parameters as an image control signal to the image-processing unit 31.

In addition, the image analysis unit 34 controls the light control driver 35 based on a light control signal. The light control driver 35 controls the light source 36. The light control driver 35 controls the operating state (emitting states of the light-emitting devices 7R1, 7R2, 7G1, 7G2, 7B1, and 7B2) of the light source 36 based on the light co signal supplied from the image analysis unit 34. As such, for example, as shown in FIGS. 2 and 3, the emission spectrum of primary color light output from the light source is adjusted, and a color reproduction gamut is made wide without increasing the number of primary colors output from the light sources 2R, 2G, and 2B which rare the illumination device, thereby obtaining a display with high image reproduction and high image quality.

Figure 5:
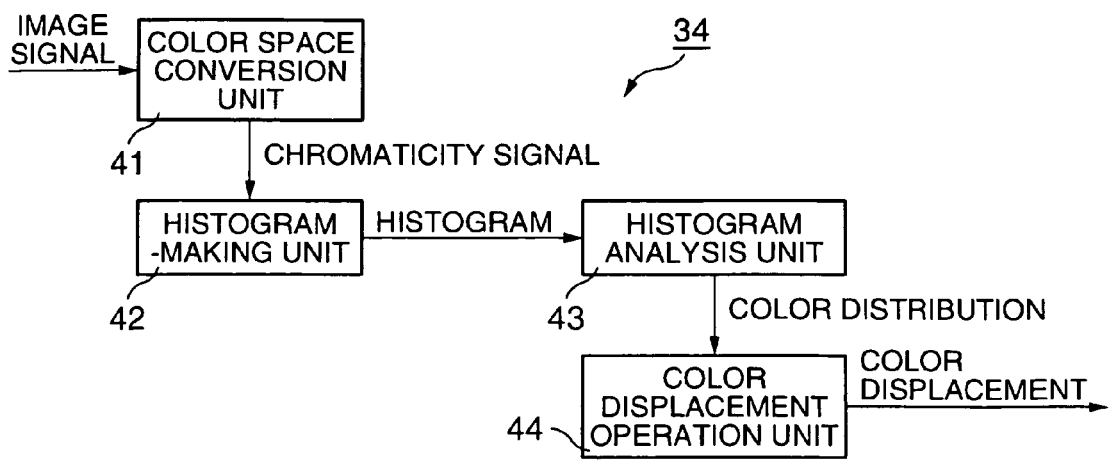
FIG. 5 is an exemplary block diagram illustrating the structure of an image analysis unit in detail.

The image analysis unit 34 has a structure as shown in FIG. 5. FIG. 5 is an exemplary block diagram illustrating the structure of the image analysis unit 34 in detail. The image analysis unit 34 includes an image signal conversion unit 41, a histogram-making unit 42, a histogram analysis unit 43, And a color displacement operation unit 44.

The image signal conversion unit 41 converts inputted RGB signals into a color space that can be represented by a brightness component and color components, for example, a Yuv space (RGB→Yuv). Here, preferably, the converted color space is a uniform color space (Yuv space or La*b*space). The converted image signal (chromaticity signals is supplied to the histogram-making unit. This signal conversion is performed based on the following transformation formula (Equation 1). In the Yuv space, Y means brightness, and u and v mean chromaticity. Hue H and saturation S can be derived from Y, u, and v using the transformation matrix (Equation 1).

$$\begin{pmatrix} Y \\ u \\ v \end{pmatrix} = \begin{pmatrix} 0.299 & 0.587 & 0.114 \\ -0.147 & -0.289 & 0.436 \\ 0.615 & -0.515 & -0.100 \end{pmatrix} \begin{pmatrix} R \\ G \\ B \end{pmatrix}$$ [Equation 1]

$$\begin{pmatrix} R \\ G \\ B \end{pmatrix} = \begin{pmatrix} 1 & 0 & 1.14 \\ 1 & -0.394 & -0.581 \\ 1 & 2.03 & 0 \end{pmatrix} \begin{pmatrix} Y \\ u \\ v \end{pmatrix}$$

$H = \tan^{-1}(v/u)$ $S = \sqrt{u^2 + v^2}/Y$

Figure 6:
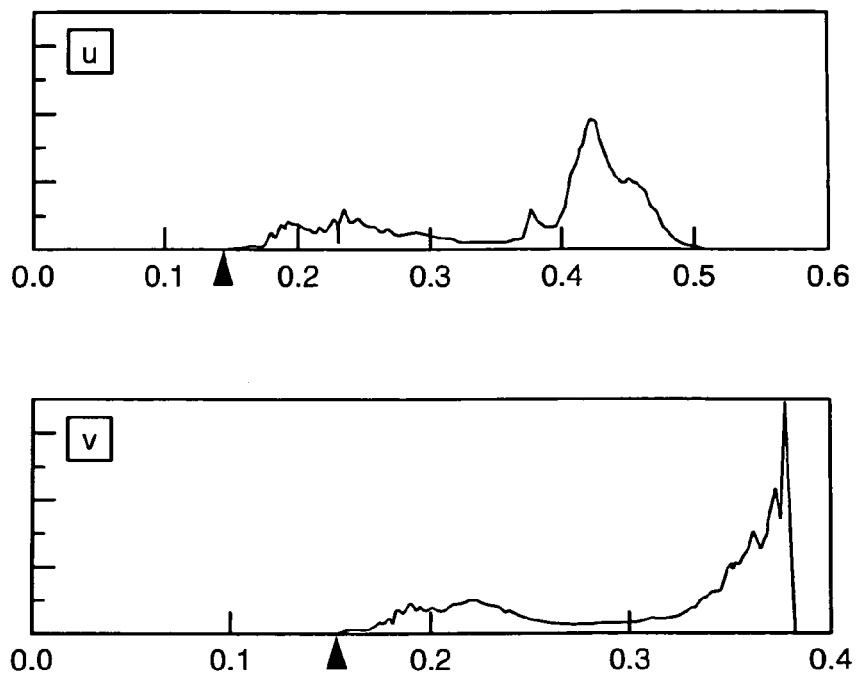
FIG. 6 illustrates an example of a histogram of u-signal and v-signal.

The histogram-making unit 42 makes a histogram (appearance frequency distribution) shown in FIG. 6 based on inputted chromaticity signals. In other words, the histogram-making unit 42 makes the histogram using the signals u and v included in the image signals converted in the Yuv space. The histogram is supplied to the histogram analysis unit 43.

The histogram analysis unit 43 which receives the histogram, performs analysis of u and v the histogram of and supplies respective color distribution information (maximum value, minimum value, average value, and maximum frequency value, etc.) to the color displacement operation unit 44. For example, in FIG. 6, the minimum value of each signal indicated by a triangular mark on an axis of ordinate of each histogram is output to the color displacement operation unit 44.

Based on color distribution information, the color displacement operation unit 44 calculates an expansion factor or a correction factor of the image-processing unit 31, or derives a color displacement used in calculating parameters for light control in the light control driver 35, and outputs the parameters as an image processing signal and a light control signal.

In the embodiment, the light control driver 35, which receives the light control signal, calculates parameters for controlling output states of the respective light-emitting devices 7R1, 7R2, 7G1, 7G2, 7B1, and 7B2 disposed in the light source 36 (light sources 2R, 2G, and 2B) based on the color displacement, and when an image much including a yellowish-red area, for example, as in the histogram shown in FIG. 6, is displayed, the light control driver 35 outputs an instruction to change operating states of the light-emitting devices 7R1 and 7R2 with respect to the light source 2R for emitting red light to the light source 36.

Meanwhile, if the RGB signal, as an image signal, is inputted to the image-processing unit 31, the image-processing unit 31 converts the RGB signal into the Yuv space which is a color space. Next, after predetermined image processing is performed on the image signal converted into the color space, inverse-transformation of the color space is performed, and the image is inversely transformed into the RGB signal. Thereafter, the image signal (RGB signal) modulated by the image-processing unit 31 is inputted to the light valve driver 32 for primary color light. The light valve driver 32 controls the light valve 33 (liquid crystal light valves 22 to 24) for primary color light based on the RGB signal.

Figure 7:
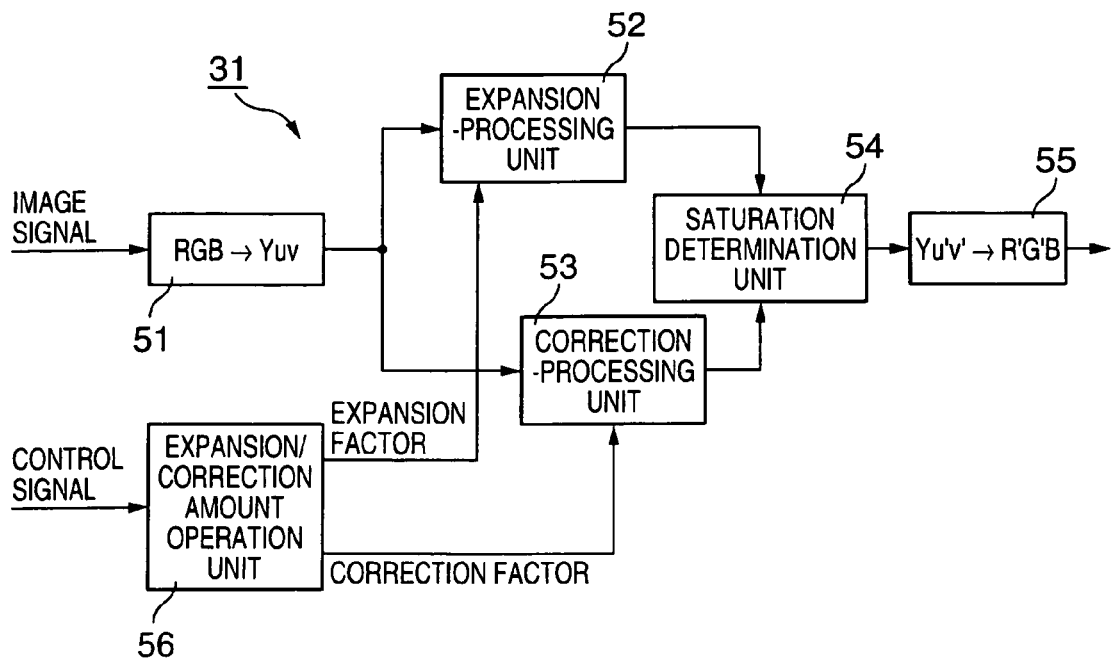
FIG. 7 is an exemplary block diagram illustrating the structure of an image-processing unit in detail.

FIG. 7 is an exemplary block diagram illustrating the structure of the image-processing unit 31. The image-processing unit 31 according to the embodiment can include an image signal conversion unit 51, an expansion-processing unit 52, a correction-processing unit 53, a saturation determination unit 54, an image signal inverse-transformation unit 55, and an expansion/correction amount operation unit 56.

The image signal conversion unit 51 has the same function as that of the image signal conversion unit 41 included in the image analysis unit 34 and converts the input RGB signal into the Yuv space which is a color space.

The expansion-processing unit 52 and the correction-processing unit (the chromaticity correction device) 53 perform expansion processing and correction processing of the image signal based on the expansion factor and the correction factor respectively supplied from the expansion/correction amount operation unit 56. The expansion/correction amount operation unit 56 calculates the expansion factor and the correction factor from the image control signal supplied from the image analysis unit 34.

The saturation determination unit 54 determines a difference in color balance (white balance) in a low saturation region (a region near white) of the expansion-processed image signal, and, in a case in which white balance needs to be corrected, the saturation determination unit 54 updates the image signal in the region as a correction result of the correction-processing unit 53 and outputs the image signal whose white balance is properly maintained.

In other words, with adjustment of the emission spectrum of the light source 36 based on the analysis result of the displayed image, the projection display device according to the embodiment performs expansion (expansion-processing unit 52) of chromaticity (saturation) based on histogram analysis and correction (correction-processing unit 53) of the difference in white balance accompanied by adjustment of the emission spectrum or an expansion of chromaticity.

The image signal inverse-transformation unit 55 performs inverse-transformation of the color space and inversely transforms the Yuv space into the RGB signal.

Figure 8:
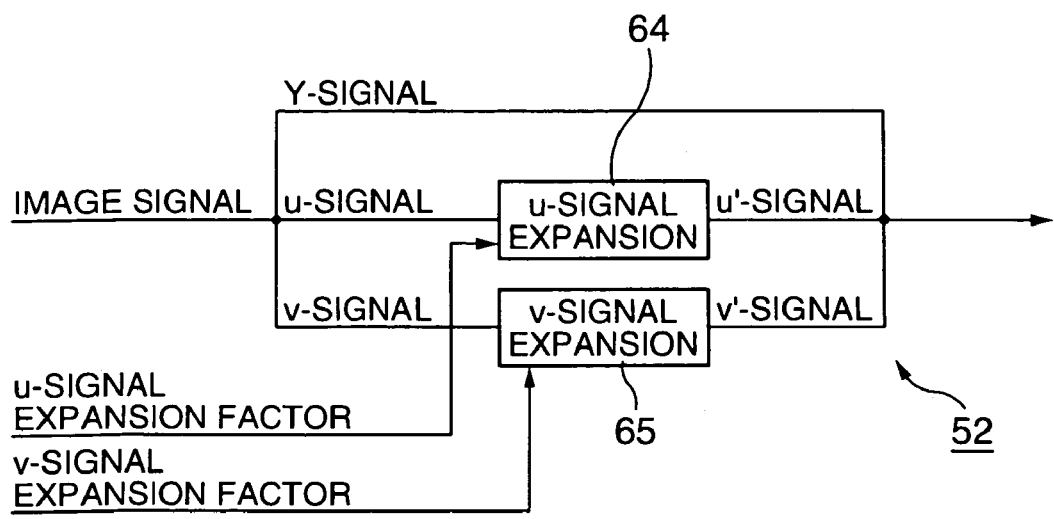
FIG. 8 is an exemplary block diagram illustrating the structure of an expansion-processing unit of FIG. 7 in detail.
Figure 9:
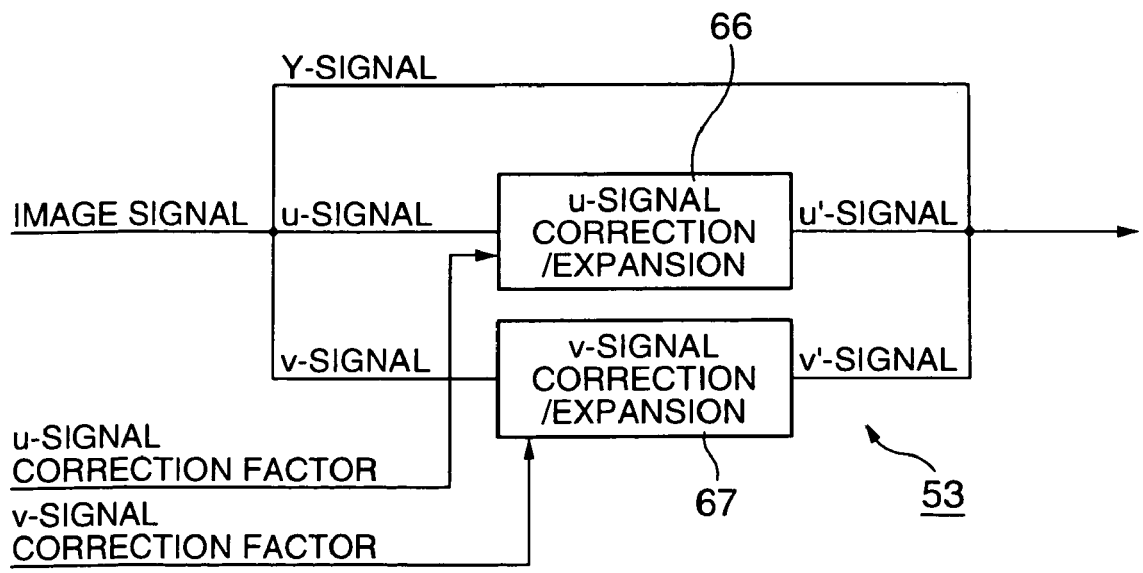
FIG. 9 is an exemplary block diagram illustrating the structure of a correction-processing unit of FIG. 7 in detail.

FIG. 8 is an exemplary block diagram illustrating the structure of the expansion-processing unit 52 in detail, and FIG. 9 is an exemplary block diagram illustrating the structure of the correction-processing unit 53 in detail.

As shown in FIG. 8, the expansion-processing unit 52 can include a u-signal expansion portion 64 and a v-signal expansion portion 65. The u-signal expansion portion 64 performs expansion processing of the u-signal which is a chromaticity signal, of the image signals converted into the Yuv space and supplied, based on the expansion factor from the expansion/correction amount operation unit 56. In addition, the v-signal expansion portion 65 performs expansion processing of the v-signal which is a chromaticity signal, based on the expansion factor supplied from the expansion/correction amount operation unit 56.

By performing expansion processing, a clear image having emphasized saturation can be obtained, and a high image quality display can be obtained. In addition, since adjustment of the image signal is performed according to adjustment of the emission spectrum of the light source 36, a displayed image having a more emphasized effect of enlarging the color reproduction gamut can be obtained by adjustment of the emission spectrum.

Expansion using a programmed formula based on the expansion factor or expansion by referring to a lookup table based on the expansion factor may be used in performing expansion processing on the u-signal expansion portion 64 and the v-signal expansion portion 65.

The correction-processing unit 53 of FIG. 9 includes a u-signal correction expansion part 66 and a v-signal correction expansion part 67. The u-signal correction expansion part 66 performs correction processing of a variation in saturation accompanied by expansion of the u-signal which is a chromaticity signal, of the image signals converted into the Yuv space and supplied, based on the correction factor from the expansion/correction amount operation unit 56. In addition, the v-signal correction expansion part 67 performs correction processing of a variation in saturation accompanied by expansion of the v-signal which is a chromaticity signal, based on the correction factor supplied from the expansion/correction amount operation unit 56. By performing correction processing, the difference in white balance accompanied by expansion of the u-signal and the v-signal or the difference in white balance by adjustment of the emission spectrum of the light source 36, is corrected if necessary. In other words, when the saturation determination unit 54 determines that a difference in white balance occurs in the image signals output from the expansion-processing unit 52, the image signals output from the correction-processing unit 53 are used to update all or a part of the image signals output from the expansion-processing unit 52. In consideration of the reduction in processing using the correction-processing unit 53 and need or no need for signal correction, preferably, the correction-processing unit 53 has a structure in which color variation is easily noticed in the correction-processing unit 53 and only color variation is corrected in a low saturation region (a region near achromatic color) having high correction probability, and processing is reduced.

Correction using a programmed formula based on the expansion factor or correction by referring to a lookup table made based on the correction factor may be used in performing correction processing on the u-signal correction expansion part 66 and the v-signal correction expansion part 67.

The projection display device having the above structure according to the present embodiment analyzes the input image signals using the image analysis unit 34, performs image processing of image signals based on the image control signal output based on an analysis result, and performs control of a light source based on the light control signal output based on the analysis result. As such, the emission spectrum of the light source is automatically adjusted according to the displayed image such that display with a substantially enlarged color gamut is obtained and high image quality having emphasized saturation is achieved by the image processing.

Figure 10:
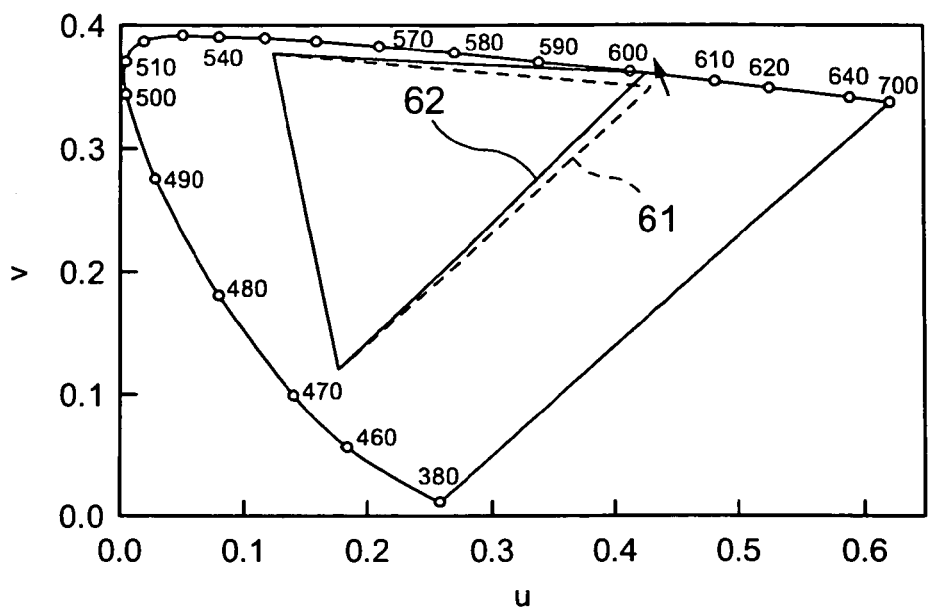
FIG. 10 illustrates a color reproduction gamut indicated on an uv chromaticity diagram.

FIG. 10 illustrates the color gamut of the projection display device according to the embodiment indicated on a uv chromaticity diagram. A triangular color gamut 61 indicated by a dotted line and a triangular color gamut 62 indicated by a solid line respectively represent color gamut before and after performing conversion of the light source 2R for emitting red light into the light-emitting devices 7R1 and 7R2. Conversion of the color gamut 61 into the color gamut 62 is performed such that colors (in this case, yellow to orange) located on the edge of the chromaticity diagram are reproduced. In this way, according to the projection display device of the embodiment, the color reproduction gamut can be substantially enlarged without increasing the number of primary colors of the illumination device.

Figure 11:
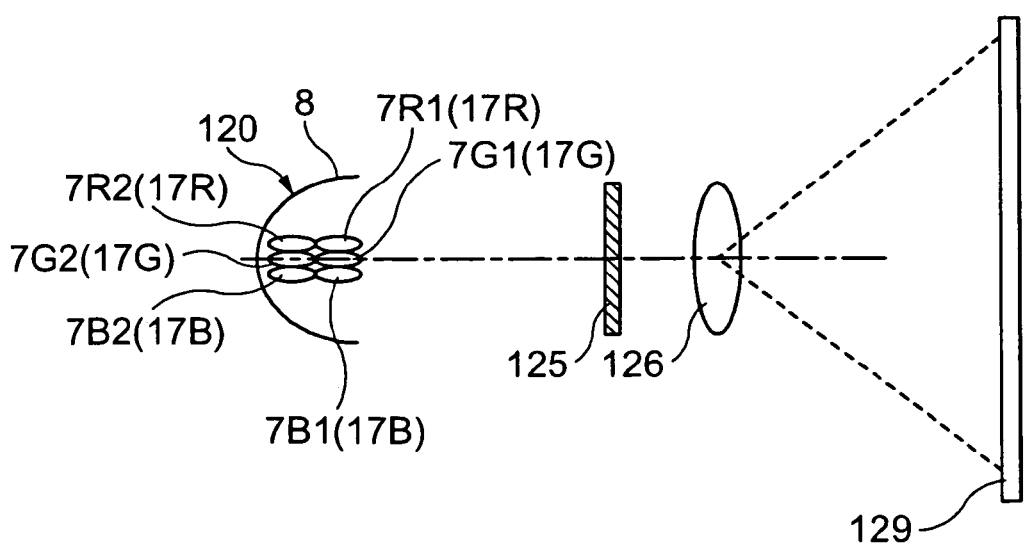
FIG. 11 schematically illustrates a projection display device according to a second embodiment of the present invention.

A three-panel type projection display device mainly including the three light sources 2R, 2G, and 2B and the liquid crystal light valves 22 to 24 corresponding to each of the light sources 2R, 2G, and 2B is shown explained in the first embodiment, but the invention may also be applied to a single panel type projection display device shown in FIG. 11. FIG. 11 schematically illustrates a projection display device according to a second embodiment of the invention. The projection display device according to the embodiment can include an illumination system (illumination device 120, a liquid crystal light valve (light modulation device) 125, and a projection device 126. Reference numeral 129 denotes a screen onto which an image is projected.

Figure 12:
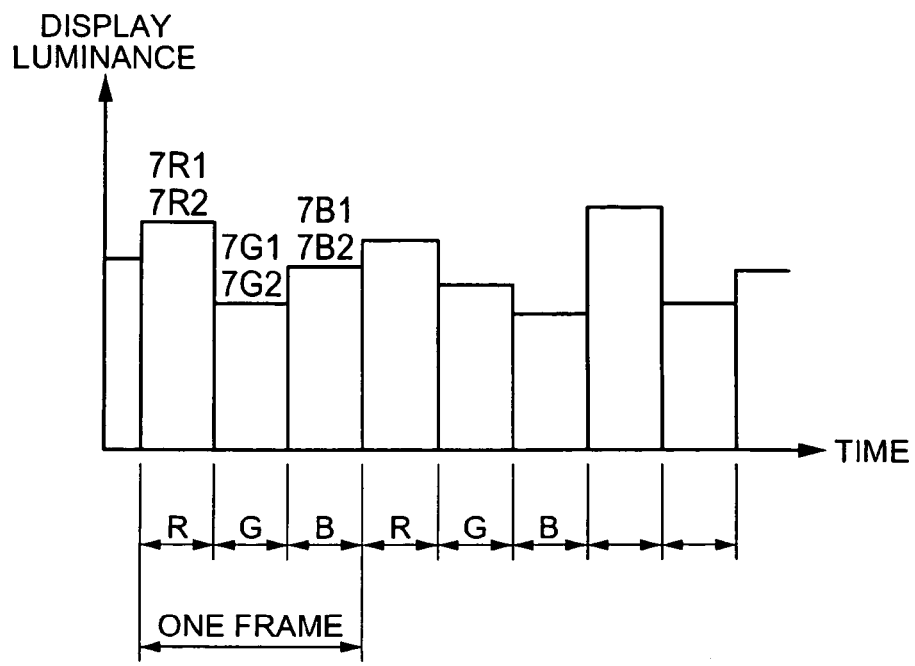
FIG. 12 is a timing chart of the projection display device.

The illumination system 120 can include a pair of light-emitting devices 17R consisting of light-emitting devices 7R1 and 7R2 for emitting red light, a pair of light-emitting devices 17G consisting of light-emitting devices 7G1 and 7G2 for emitting green light, and a pair of light-emitting devices 17B consisting of light-emitting devices 7B1 and 7B2 for emitting blue light. Each light-emitting device has different luminescent colors, and is configured to be capable of controlling outputs therefrom independently. In addition, as shown in a timing chart of FIG. 12, the respective light-emitting devices are constructed such that the pair of light-emitting devices 17R (7R1 and 7R2) within a time period of one frame, the light-emitting devices 17G (7G1 and 7G2), and the light-emitting devices 17B (7B1 and 7B2) emit light time-sequentially.

The primary color light emitted to the liquid crystal light value 125 from the illumination system 120 is modulated by the liquid crystal light valve 125 and is then projected onto the screen 129 using the projection device 126, and a color image is formed on the screen 129.

The projection display device according to the present embodiment includes a driving circuit having the structure, as shown in FIG. 4, similar to the projection display device according to the first above-described embodiment. In other words, an image-processing processing unit 31 is connected to a liquid crystal light valve 125 via a light valve driver 32, and an image analysis unit 34 is connected to the illumination system 120 via a light control driver 35. By analyzing the displayed image using the image analysis unit 34, switch or adjustment of outputs of the respective light-emitting devices 7R1, 7R2, 7G1, 7G2, 7B1, and 7B2 is preformed based on an analysis result such that the emission spectrum of primary color light output from each of the pairs of light-emitting devices 17R, 17G, and 17B is adjusted and substantial enlargement of the color gamut is obtained without increasing the number of primary colors. In addition, by performing expansion process and correction processing in the image-processing unit 31, a high quality displayed image whose saturation is emphasized and whose white balance is properly adjusted, can be obtained.

In addition, in the projection display device according to the present embodiment, a display device is configured to include, mainly, one illumination system 120 and one liquid crystal light valve 125. Thus, the projection display device according to the embodiment is advantageous to simplify an optical system and to shrink the volume.

Moreover, in the projection display device having the above structure shown in FIG. 11, a color filter may be disposed in the liquid crystal light valve 125. In this case, the light-emitting devices of the illumination system 120 do not emit light time-sequentially, but continuously emit light. Even though the projection display device has this structure, by performing image processing and control of the light source, the projection display device according to the present embodiment makes the color gamut wide and obtains a high-quality displayed image.

Figure 13:
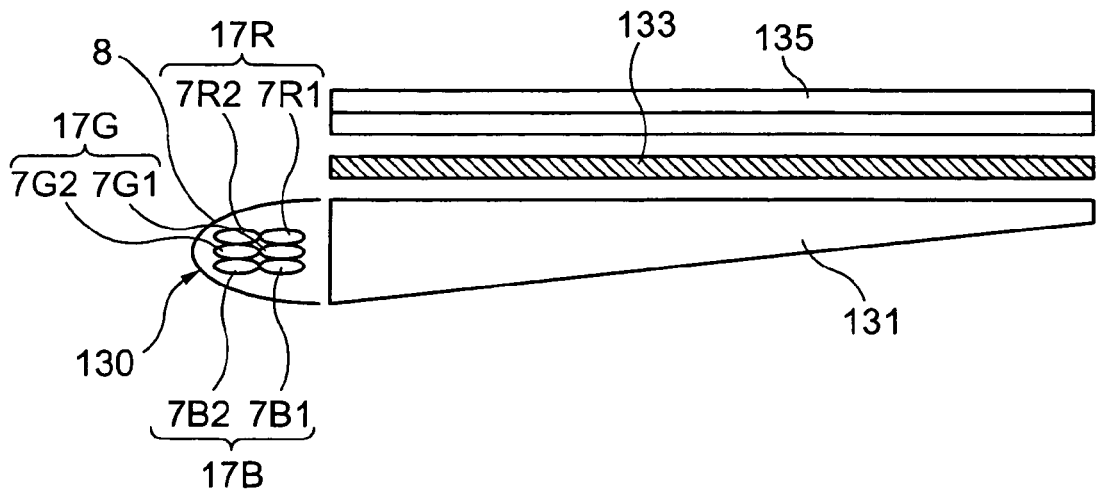
FIG. 13 schematically illustrates a liquid crystal display device according to a third embodiment of the present invention.

FIG. 13 schematically illustrates a liquid crystal display device according to a third embodiment of the invention. The liquid crystal display device of FIG. 13 includes an illumination system (illumination device) 130 having a plurality of light-emitting devices, a light guide panel 131, a color filter 133 disposed on the front face of the light guide panel 131, and a liquid crystal panel 135 disposed on the front face of the color filter 133.

The illumination system 130 can include a pair of light-emitting devices 17R consisting of light-emitting devices 7R1 and 7R2 for emitting red light, a pair of light-emitting devices 17G consisting of light-emitting devices 7G1 and 7G2 for emitting green light, and a pair of light-emitting devices 17B consisting of light-emitting devices 7B1 and 7B2 for emitting blue light. In other words, the pairs of light-emitting devices 17R, 17G, and 17B are used as elements corresponding to the light sources in the first embodiment so that primary color light emitted from the pairs of light-emitting devices 17R, 17G, and 17B is mixed and is incident on the light guide panel 131. The light guide panel 131 directs illumination toward an upper direction which is a traveling direction of light so that the rear face of the liquid crystal panel 135 is illuminated. The color filter 133 has a structure in which color material layers of respective colors of red, green, and blue are arranged.

The display device according to the present embodiment can also include a driving circuit having the structure of FIG. 4, like the projection display device according to the first embodiment. In other words, the image-processing unit 31 is connected to the liquid crystal light valve 125 via the light valve driver 32, and the image analysis unit 34 is connected to the illumination system 120 via the light control driver 35. Analysis of a displayed image is performed using the image analysis unit 34, and conversion or adjustment of outputs of the respective light-emitting devices 7R1, 7R2, 7G1, 7G2, 7B1, and 7B2 is preformed based on an analysis result such that the emission spectrum of primary color light output from each of the pairs of light-emitting devices 17R, 17G, and 17B is adjusted and substantial enlargement of the color reproduction gamut is obtained without increasing the number of primary colors. In addition, by performing expansion processing and correction processing on the image-processing unit 31, a high quality displayed image whose saturation is emphasized and whose white balance is properly adjusted, is obtained.

Figure 14:
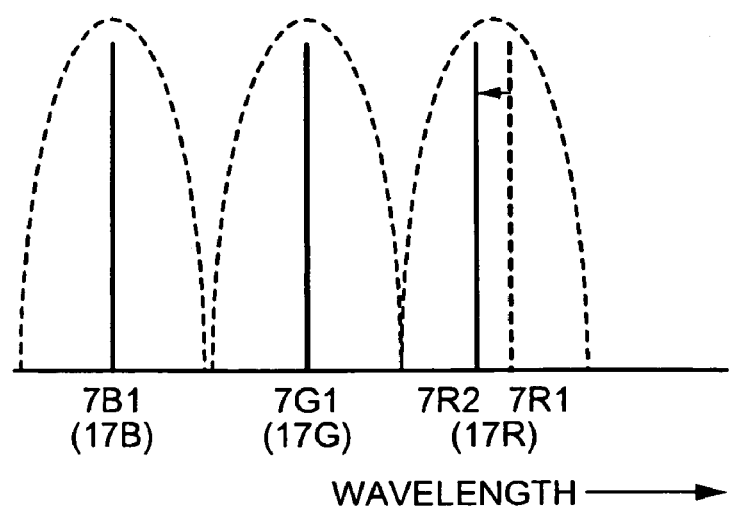
FIG. 14 illustrates a function of the liquid crystal display device.
Figure 15:
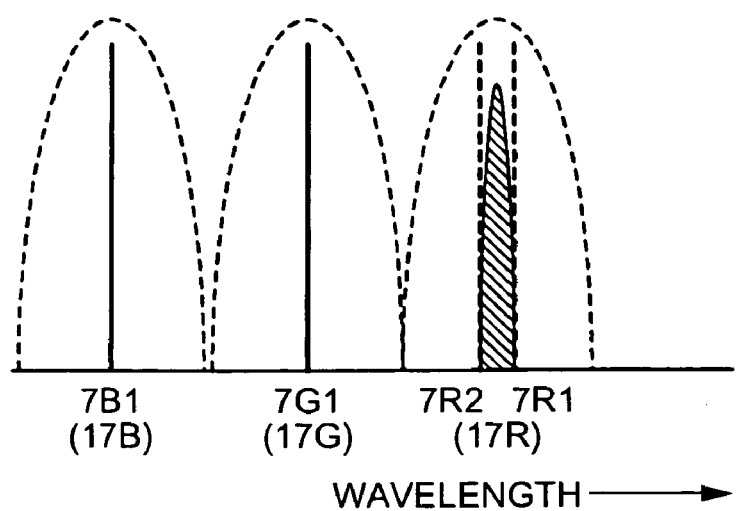
FIG. 15 illustrates a function of the liquid crystal display device.

In addition, in order to effectively perform adjustment of the emission spectrum using switch or adjustment of outputs of the respective light-emitting devices 7R1, 7R2, 7G1, 7G2, 7B1, and 7B2, the liquid crystal display device according to the embodiment has the relation between the emission spectrum of each light-emitting device and the transmission spectrum of the color filter 133, respectively, as shown in FIGS. 14 and 15. FIGS. 14 and 15 illustrate the function of the liquid crystal display device according to the present embodiment. FIG. 14 illustrates a case in which the emission spectrum of primary color light is adjusted by switch between the light-emitting devices 7R1 and 7R2, and FIG. 15 illustrates a case in which the emission spectrum of primary color light is adjusted by adjustment of output ratios of the light-emitting devices 7R1 and 7R2. Regions of FIGS. 14 and 15 surrounded by dotted lines indicated by 133R, 133G, and 133B respectively represent the transmission spectrum of a color material layer provided in each color (red, green, blue) of the color filter 133.

As shown in FIGS. 14 and 15, the emission spectrum of the respective light-emitting devices 7R1, 7R2, 7G1, 7G2, 7B1, and 7B2 of the liquid crystal display device according to the embodiment is located in a wavelength region that does not exceed the range of the corresponding transmission spectrum of the color material layer of the color filter 133. Even though adjustment of the emission spectrum in the pairs of light-emitting devices 17R, 17G, and 17B is performed based on the above structure, each primary color light transmits the color filter 133 and is used as illumination light, thereby obtaining a display effectively using an enlarged color gamut.

Figure 16:
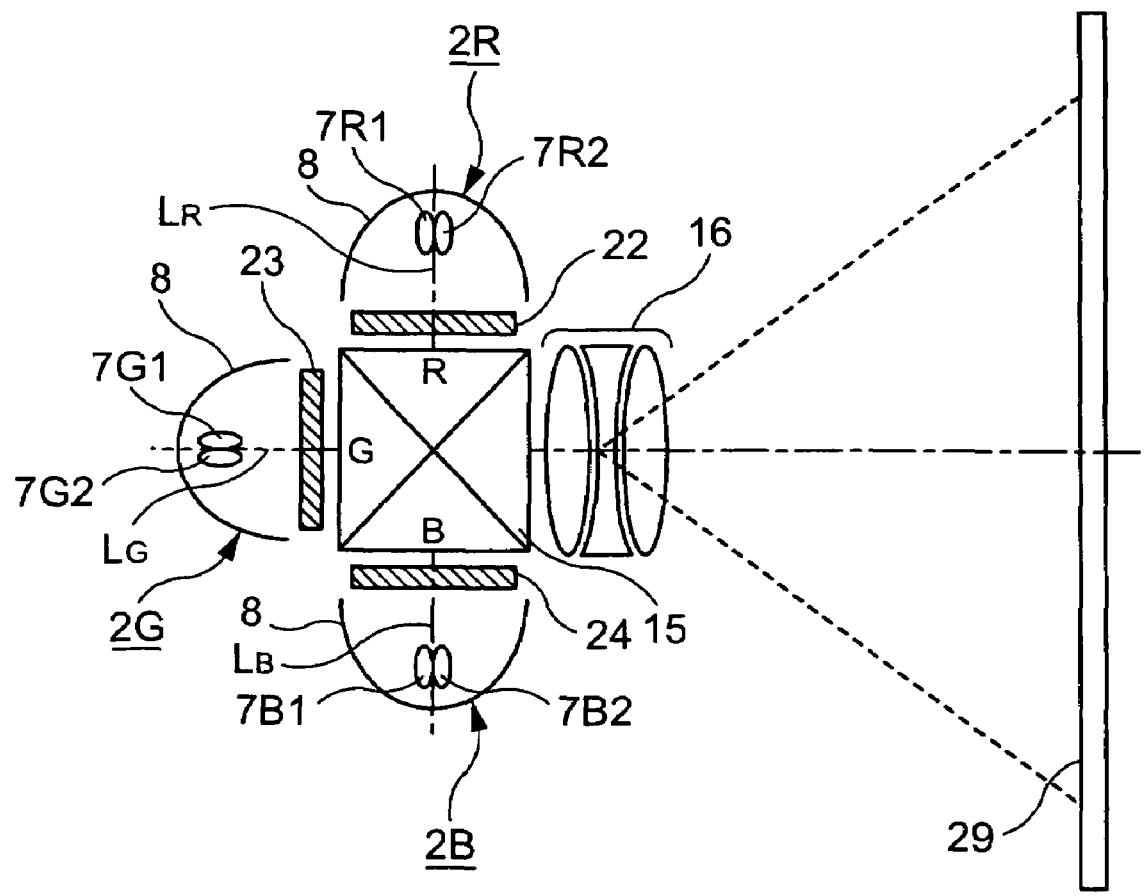
FIG. 16 schematically illustrates a projection display device according to a fourth embodiment of the present invention.

FIG. 16 schematically illustrates the structure of a projection display device according to a fourth embodiment of the invention. The projection display device of FIG. 16 can include an illumination system (illumination device) having light sources 2R, 2G, and 2B, liquid crystal light valves 22 to 24 provided to correspond to each light source, a dichroic prism 15 for composition of light output from the liquid crystal light valves 22 to 24 and generating a displayed image, and a projection device 16. In addition, in FIG. 16, the same elements as those of FIG. 1 are given the same reference numerals, and detailed description thereof will be appropriately omitted.

The projection display device according to the embodiment can have the same structure as that of the projection display device according to the first embodiment, except that a dichroic prism 15, which is a color composite device, is provided and an image is projected from a single projection device 16. However, the projection display device according to the embodiment is different from the projection display device according to the first embodiment in that the emission spectrum of the respective light-emitting devices 7R1, 7R2, 7G1, 7G2, 7B1, and 7B2 is located within the range of the transmission spectrum (the transmission wavelength range) of the dichroic prism 15.

In addition to producing the same effect as that of the projection display device according to the first embodiment, when adjustment of the emission spectrum of primary color light emitted from the respective light sources 2R, 2G, and 2B is performed, absorption of light using a dichroic prism 15 is prevented, thereby obtaining a display effectively using an enlarged color gamut.

Figure 17:
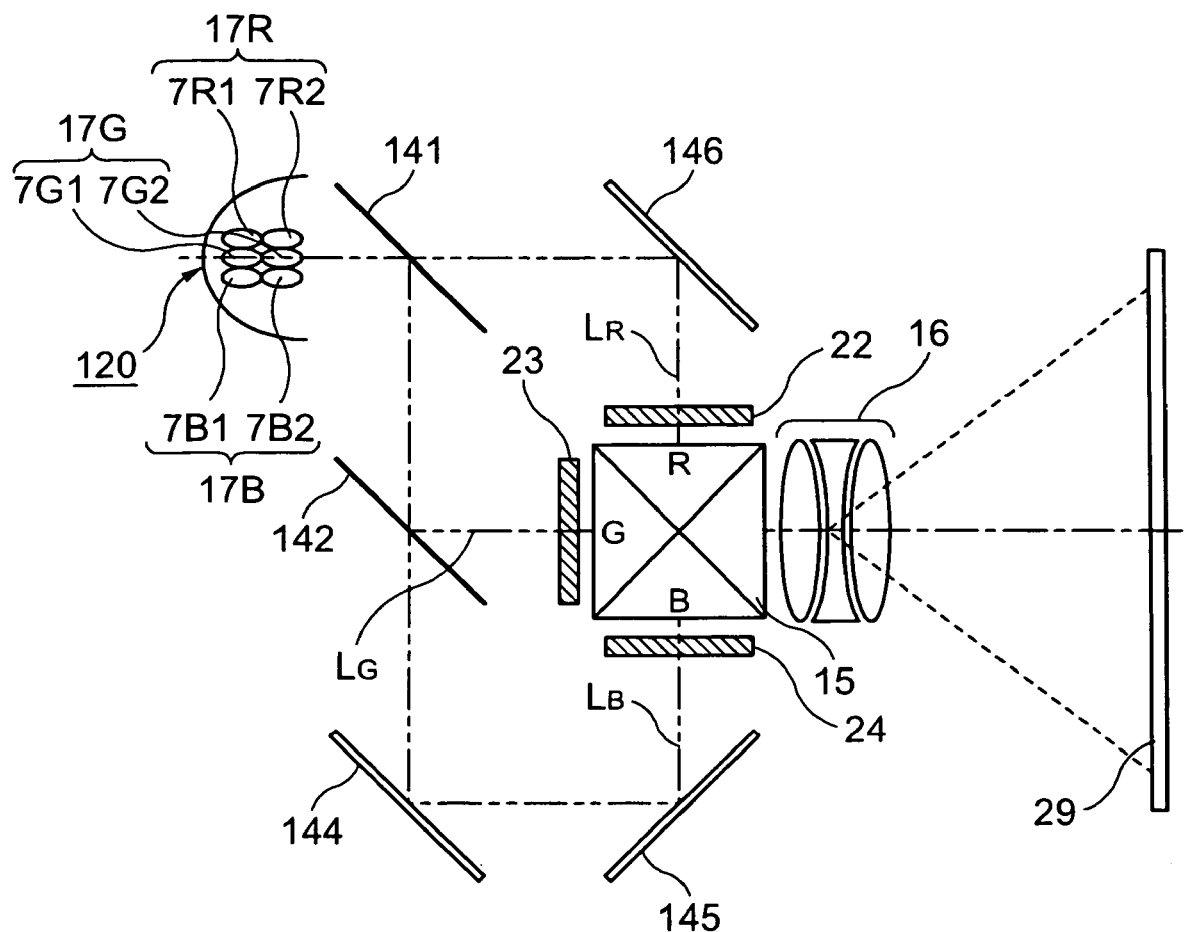
FIG. 17 schematically illustrates a projection display device according to a fifth embodiment of the present invention.

FIG. 17 schematically illustrates a projection display device according to a fifth embodiment of the invention. The projection display device of FIG. 17 includes an illumination system 120 having a plurality of light-emitting devices, dichroic mirrors 141 and 142 used as a color separation device for separating light emitted from the illumination system 120 into three primary color light components, liquid crystal light valves 22 to 24 provided to correspond to each of the separated primary color light, reflective mirrors 144 to 146 for guiding each of separated primary color light components to the liquid crystal light vales 22 to 24, a dichroic prism (a color composite device) 15 for composition of light output from the liquid crystal light valves 22 to 24 and generating a displayed image, and a projection device 16. In addition, in FIG. 17, the same elements as those of FIG. 1 or 15 are given the same reference numerals, and detailed description thereof will be appropriately omitted.

In the projection display device of FIG. 17, primary color light components emitted from the plurality of pairs of light-emitting devices 17R, 17G, and 17B are mixed and are used as illumination light. Thereafter, the illumination light is separated into red light LR, green light LG, and blue light LB using the dichroic mirrors 141 and 142 and is incident on the liquid crystal light valves 22 to 24. As such, the projection display device of FIG. 17 includes a color separation system and performs adjustment of the emission spectrum of each primary color light using output switching or output ratio adjustment of the light-emitting devices.

In addition, in the projection display device according to the present embodiment, the emission spectrum of the respective light-emitting devices 7R1, 7R, 7G1, 7G2, 7B1, and 7B2 provided in the illumination system 120 is selected so as to be located within the range of the transmission spectrum (the transmission wavelength range) of the dichroic prism 15, and is selected so as to be located within the range of the transmission spectrum of the dichroic mirrors 141 and 142.

In addition to producing the same effect as that of the projection display device according to the first embodiment, when adjustment of the emission spectrum of primary color light emitted from the illumination system 120 is performed, occurrence of absorption of light using the dichroic prism 15 and the dichroic mirrors 141 and 142 is prevented, thereby obtaining display effectively using an enlarged color gamut.

In the first to fifth embodiments, in order to perform adjustment of the emission spectrum of primary color light emitted from the illumination system, output conversion or output ratio adjustment of the plurality of light-emitting devices is performed. However, in the display device according to the present invention, adjustment of the emission spectrum may be performed using an optical device.

Figure 18:
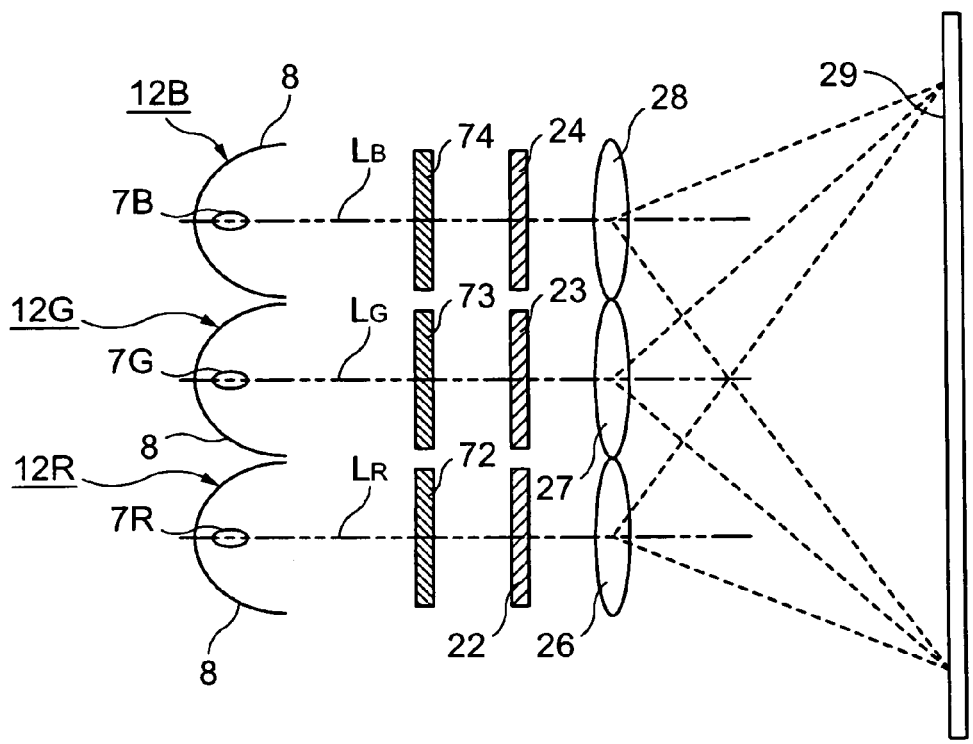
FIG. 18 schematically illustrates a projection display device according to a sixth embodiment of the present invention.

FIG. 18 schematically illustrates a projection display device according to a sixth embodiment of the invention. The projection display device of FIG. 18 includes three light sources 12R, 12G, and 12B, variable band pass filters (band controlling means) 72 to 74 provided to correspond to each light source, liquid crystal light valves 22 to 24, and projection devices 26 to 28. In addition, in FIG. 18, the same elements as those of FIG. 1 are given the same reference numerals, and detailed description thereof will be appropriately omitted.

In the projection display device according to the present embodiment, the light sources 12R, 12G, and 12B forming the illumination system may be configured of a single light-emitting device. Preferably, a light-emitting device having a wide band (an emission wavelength range) rather than a light-emitting device having a narrow band, such as a single color LED, is used as the light sources 12R, 12G, and 12B. In the present embodiment, primary color light emitted from the respective light sources 12R, 12G, and 12B is converted into primary color light having a narrow band using the variable band pass filters 72 to 74 forming band controlling means to be incident on the liquid crystal light valves 22 to 24.

The variable band pass filter is an optical filter capable of changing the transmission wavelength range, and for example, an optical filter which electrically controls the alignment (pitch, etc.) of a liquid crystal composition and performs adjustment of the transmission wavelength range, may be used as the variable band pass filter.

Figure 19:
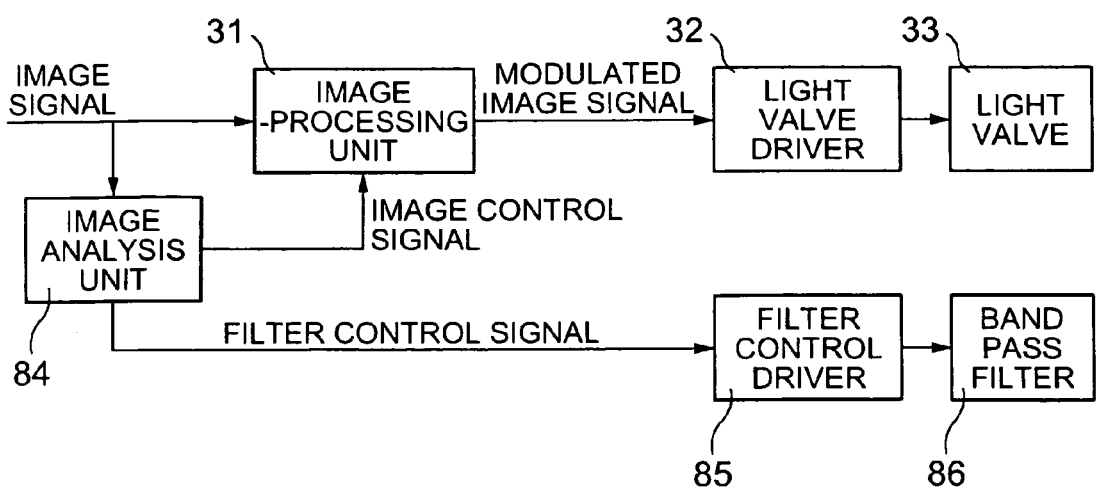
FIG. 19 is an exemplary block diagram of the driving circuit.

FIG. 19 is an exemplary block diagram of a driving circuit of the projection display device according to the present embodiment. The driving circuit of FIG. 19 mainly includes an image-processing unit 31, a light valve driver 32, an image analysis unit 84, and a filter control driver 85. In addition, in FIG. 19, the same elements as those of FIGS. 4 to 9 are given the same reference numerals, and detailed description thereof will be appropriately omitted.

In the driving circuit, the image analysis unit 84 has the same structure as that of the image analysis unit 34 of FIG. 5. The image analysis unit 84 converts input image signals into a Yuv space, makes a histogram of the u-signal and the v-signal, derives color distribution of the image signals by performing analysis of the histogram, and outputs a color displacement to the image-processing unit 31 and the filter control driver 85 as an image control signal (color displacement) and a filter control signal from the color distribution.

The filter control driver (band controlling device) 85 is connected to the band pass filter 86 (variable band pass filters 72 to 74) and controls a transmission band of the band pass filter 86 based on the filter control signal received from the image analysis unit 84.

The image-processing unit 31 performs the same image processing as that of the first embodiment on the input image signals based on the image control signal, performs expansion processing of the u-signal and the v-signal, and performs correction processing of white balance if necessary.

In this way, in the projection display device according to the present embodiment, the illumination spectrum of primary color light illuminated to the liquid crystal light valves 22 to 24 is adjusted using the variable band pass filters 72 to 74 disposed between the light sources 12R, 12G, and 12B and the liquid crystal light valves 22 to 24, so that the color reproduction gamut is substantially enlarged, as in the first embodiment, thereby obtaining excellent image reproduction and thereby displaying a clear high-quality image whose saturation is emphasized.

In addition, since the projection display device according to the embodiment can have a wide emission wavelength range as a light source, the flexibility of light source selection is high, and a light source can be selected according to display luminance or costs, as well as the size of a device.

Figure 20:
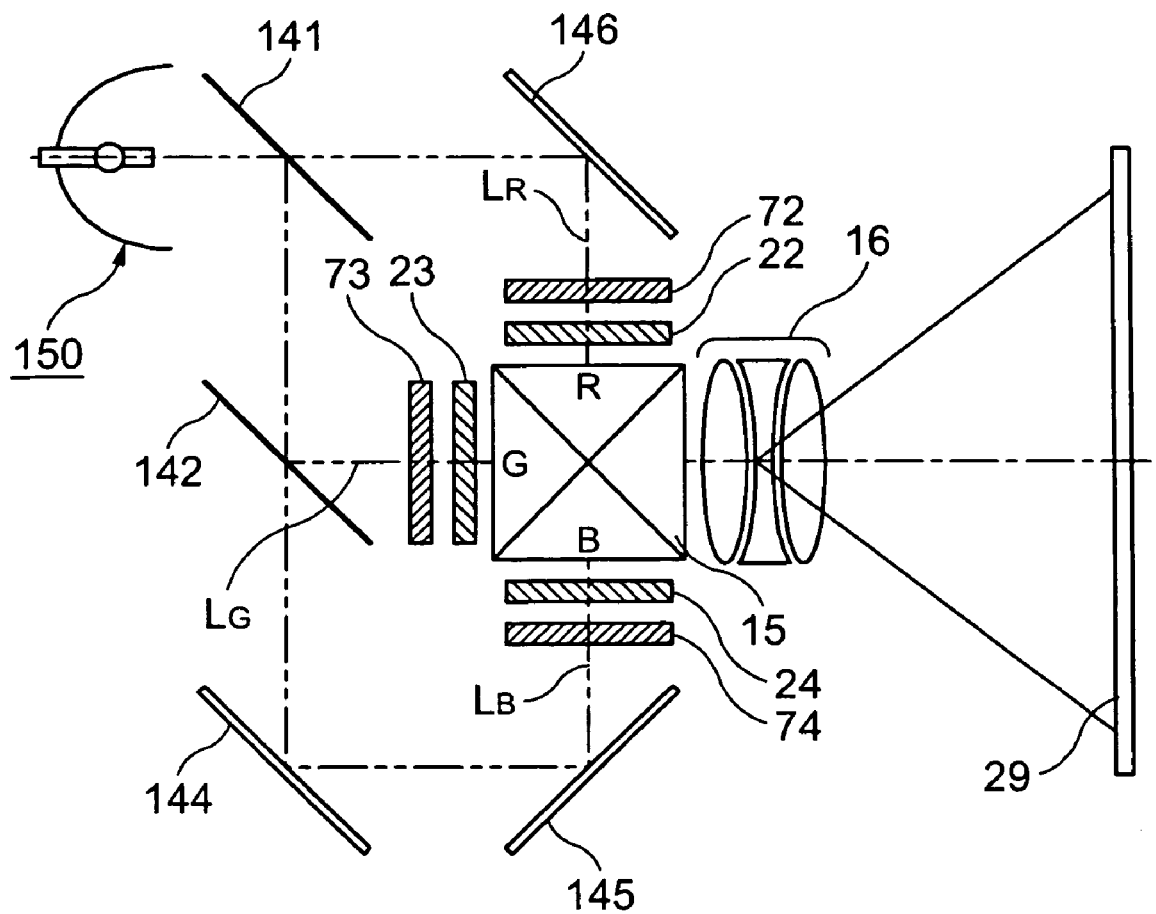
FIG. 20 schematically illustrates a projection display device according to a seventh embodiment of the present invention.

FIG. 20 schematically illustrates a projection display device according to a seventh embodiment of the invention. The projection display device of FIG. 20 can include a light source 150 for emitting white light, dichroic mirrors 141 and 142 for separating light emitted from the light source 150 into a plurality of primary color light components (red light LR, green light LG, and blue light LB), a plurality of reflective mirrors 144 to 146, variable band pass filters 72 to 74, liquid crystal light valves 22 to 24, a dichroic prism 15, and a projection device 16. In addition, in FIG. 20, the same elements as those of FIGS. 17 and 18 are given the same reference numerals, and detailed description thereof will be appropriately omitted.

A high-pressure mercury lamp or a metal halide lamp, a white LED, or a white EL device may be used as the white light source 150.

In the projection display device according to the invention, the primary color light components LR, LG, and LB emitted to each of the liquid crystal light valves 22 to 24 are emitted from the white light source 150, are sequentially separated using the dichroic mirrors 141 and 142, and are divided into primary color light having a narrow band using the variable band pass filters 72 to 74.

Since the projection display device according to the present embodiment also includes the driving circuit of FIG. 19, the projection display device controls the transmission wavelength range of the variable band pass filters 72 to 74, thereby adjusting the illumination spectrum of primary color light illuminated to the liquid crystal light valves 22 to 24, substantially enlarging the color reproduction gamut, and obtaining high quality image reproduction.

In addition, since the projection display device according to the present embodiment uses a wide emission wavelength range as a light source, the flexibility of light source selection is high, and a light source can be selected according to brightness or costs, as well as the volume of the display device.

Figure 21:
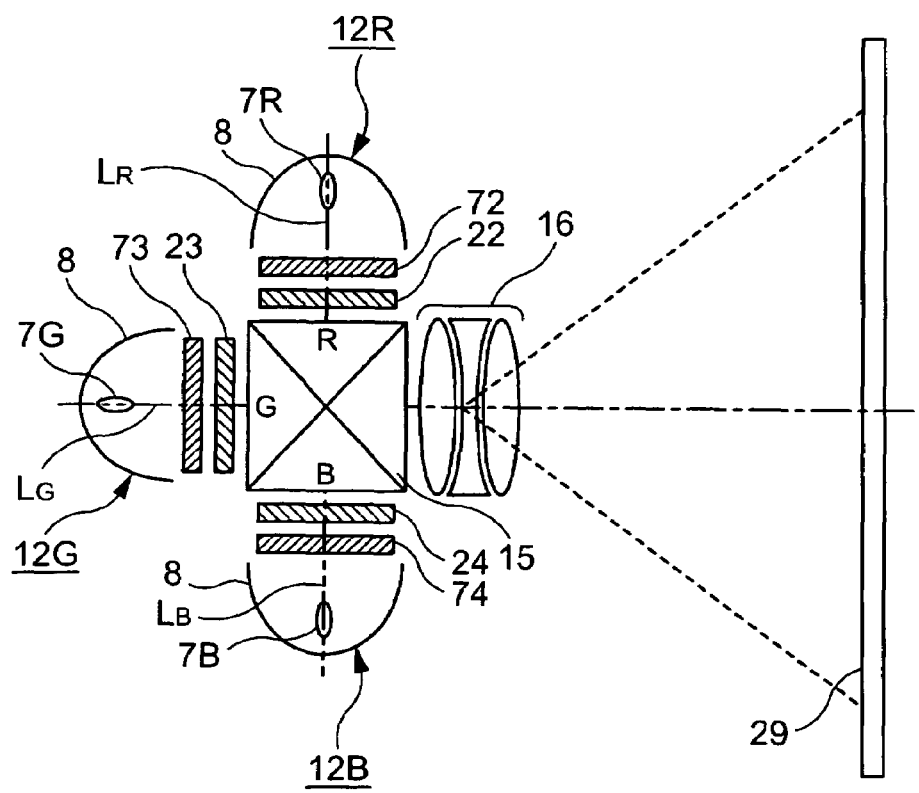
FIG. 21 schematically illustrates a projection display device according to an eighth embodiment of the present invention.

FIG. 21 schematically illustrates a projection display device according to an eighth embodiment of the present invention. The projection display device of FIG. 21 can include light sources 12R, 12G, and 12B, variable band pass filters 72 to 74 provided to correspond to each light source, liquid crystal light vales 22 to 24, a dichroic prism 15, and a projection device 16. In addition, in FIG. 21, the same elements as those of FIGS. 16 and 18 are given the same reference numerals, and detailed description thereof will be appropriately omitted.

The projection display device according to the present embodiment changes each primary color light emitted from the three light sources 12R, 12G, and 12B into primary color light having a narrow band using the variable band pass filters 72 to 74 to be incident on the liquid crystal light valves 22 to 24.

Since the projection display device according to the present embodiment also includes the driving circuit of FIG. 19, the projection display device controls the transmission wavelength range of the variable band pass filters 72 to 74, thereby adjusting the emission spectrum of primary color light emitted to the liquid crystal light vales 22 to 24, thus substantially enlarging a color reproduction gamut, and obtaining high quality image reproduction.

In addition, since the projection display device according to the present embodiment uses a wide emission wavelength range as a light source, the flexibility of light source selection is high, and a light source can be selected according to brightness or costs, as well as the volume of the display device.

Figure 22:
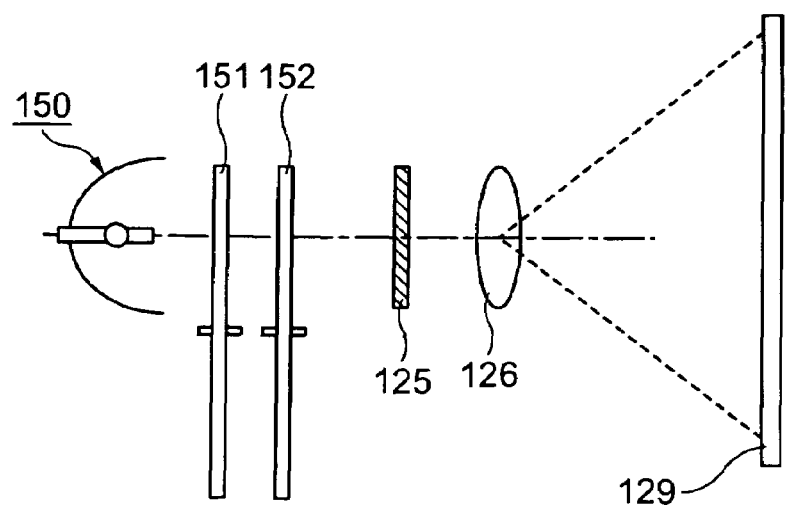
FIG. 22 schematically illustrates a projection display device according to a ninth embodiment of the present invention.

FIG. 22 schematically illustrates a projection display device according to a ninth embodiment of the invention. The projection display device of FIG. 22 includes a light source 150 for emitting white light, two color wheels (sequential color filters) 151 and 152, a liquid crystal light valve 125, and a projection device 126. In addition, in FIG. 22, the same elements as those of FIGS. 11 and 20 are given the same reference numerals, and detailed description thereof will be appropriately omitted.

Figure 23:
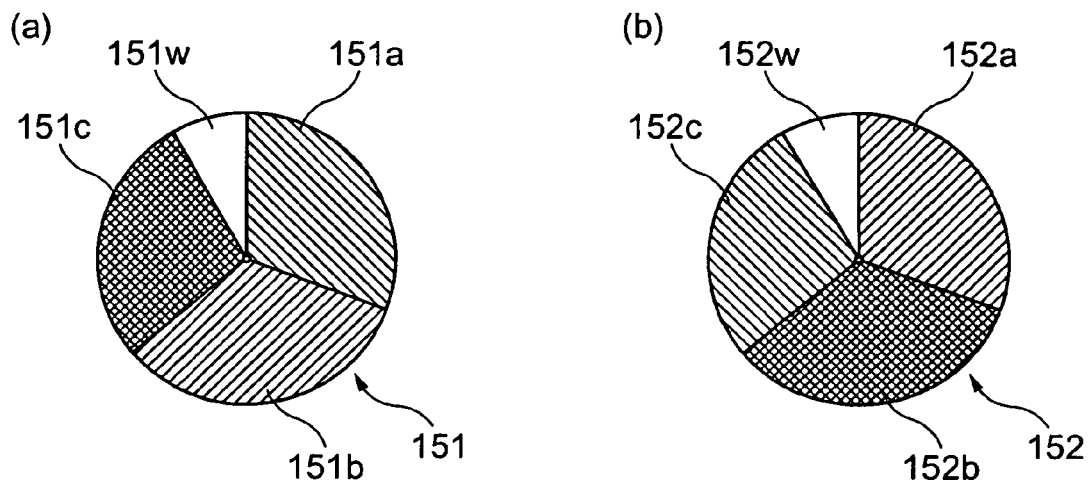
FIG. 23 is a plan view illustrating color wheels.

FIG. 23 is a plan view of the color wheels 151 and 152 of FIG. 22. The first color wheel 151 can include three-color color filters 151a to 151c arranged in a circumferential direction, and an opening 151w as shown in FIG. 23(a). In addition, the second color wheel 152 includes three-color color filters 152a to 152c arranged in the circumferential direction, and an opening 152w. The openings 151w and 152w may be formed of a region in which a color filter is not provided, or may be formed of a colorless filter using transparent glass or resin.

The projection display device having the above structure according to the embodiment sequentially divides light output from the light source 150 into primary color light having a predetermined wavelength range (a predetermined color) using the two color wheels 151 and 152 alternately, to be incident on the liquid crystal light valve 125, projects light modulated by the liquid crystal light valve 125 onto the screen 129 using the projection device 126, and forms a color image on the screen 129. Accordingly, in the embodiment, the color wheels 151 and 152 perform as a band controlling device for adjusting the illumination spectrum of primary color light incident on the liquid crystal light valve 125.

In addition, the color wheels 151 and 152 are exclusively used during a display operation. In other words, when the color filters 151a to 151c of the color wheel 151 are used, the transparent interval 152w of the color wheel 152 is disposed on an optical path, and when the color filters 152a to 152c of the color wheel 152 are used, the transparent interval 151w of the color wheel 151 is disposed on the optical path.

Figure 24:
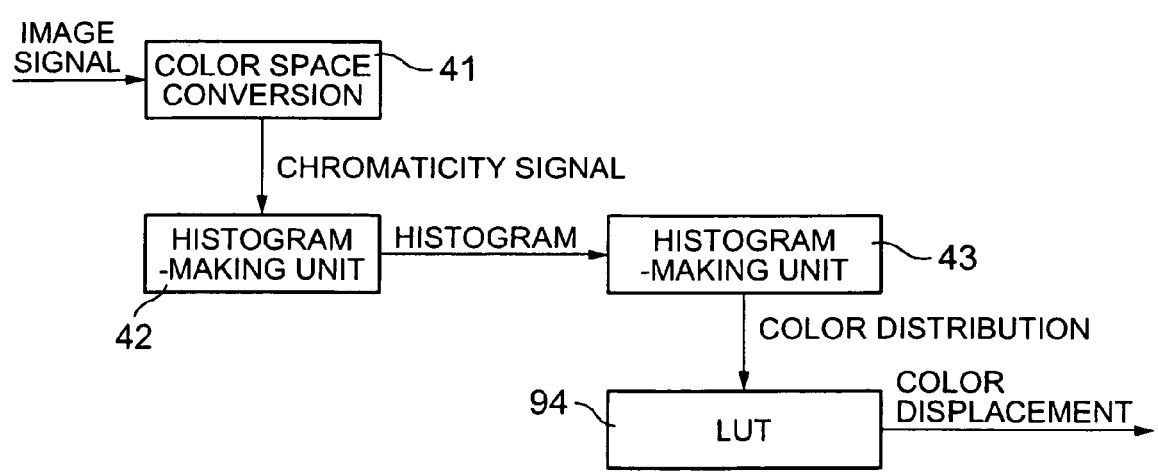
FIG. 24 is an exemplary block diagram of an image analysis unit.

The projection display device according to the embodiment includes the driving circuit having the structure, as shown in FIG. 19, and an image analysis unit thereof has a structure shown in an exemplary block diagram of FIG. 24. The image analysis unit of FIG. 24 includes an image signal conversion unit 41, a histogram-making unit 42, a histogram analysis unit 43, and a color displacement operation unit 94. In addition, in FIG. 24, the same elements as those of FIG. 5 are given the same reference numerals, and detailed description thereof will be appropriately omitted.

The color displacement operation unit 94 according to the embodiment includes a lookup table that causes color distribution information supplied from the histogram analysis unit 43 to correspond to the color filters 151a to 151c and 152a to 152c provided in the color wheels 151 and 152 and is adapted to be capable of selecting an appropriate color filter based on display image information. The color displacement operation unit 94 controls the filter control driver 85 based on the filter control signal output from the color displacement operation unit 94 and selects a color filter to be used in the two color wheels 151 and 152. Since in the embodiment, adjustment of the illumination spectrum is performed by color filter switching of the color wheels 151 and 152 performing as the band controlling device, the color displacement can be derived referring to the lookup table, thereby performing high-speed analysis processing.

In this way, in the projection display device having the above structure according to the embodiment, the using color filter of the color wheels 151 and 152 is switched, thereby adjusting the emission spectrum of primary color light emitted to the liquid crystal light valve 125 according to displayed images, and a color gamut is substantially enlarged, as in the first embodiment, thereby obtaining excellent image reproduction and displaying a clear high-quality image whose saturation is emphasized.

It should be understood that light valve according to the invention is not limited to a liquid crystal light valve, and for example, even in case in which a light valve using a digital micro-mirror device is used, the same effect can be obtained.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A display device, comprising:
a plurality of light sources, in which each light source generates and outputs a different primary color light component, capable of adjusting emission spectra of the primary color light components and including a plurality of light-emitting devices respectively, each light-emitting device in one light source having a different emission spectra and being capable of independently adjusting the output therefrom;
at least one light modulation device that modulates the primary color light components output from the light sources;
an image analysis device that outputs a light control signal that adjusts the emission spectra of the primary color light components based on an image signal of a displayed image supplied to the light modulation device; and
a light controlling device that adjusts the emission spectra of the primary color light components based on the light control signal.

2. The display device according to claim 1, a color filter having a plurality of transmission spectra corresponding to the primary color light components output from the respective light sources being provided between the plurality of light sources and the at least one light modulation device, and an adjustment range of the emission spectrum of each of the light sources being within a range of the transmission spectrum of the color filter.

3. The display device according to claim 1, the at least one light modulation device being provided to correspond to each of the plurality of light sources, and the display device further comprising a color composition device that composites the primary color light components output from the at least one light modulation device, and
an adjustment range of the emission spectrum of each of the light sources is within a range of the transmission spectrum of the color composition device.

4. The display device according to claim 1, further comprising a chromaticity correction device that corrects a white balance of the light output from the plurality of light sources when adjustment of the emission spectra of the primary color light components is performed.

5. The display device according to claim 4,
the chromaticity correction device correcting the white balance in a low saturation region of the light output from the plurality of light sources.

6. A display device, comprising:
an illumination device that generates and outputs a plurality of primary color light components having different luminescent colors, the illumination device including a plurality of light sources having different luminescent colors, each of the light sources including a plurality of light-emitting devices capable of independently adjusting outputs therefrom;
a light modulation device that modulates the primary color light components output from the illumination device; and
the illumination device being capable of adjusting an emission spectra of the primary color light components, the illumination device including a color separation device that separates output light from the light sources into a plurality of primary color light components, a plurality of light modulation devices being provided to correspond to the respective primary color light components, and a color composition device for composition of the primary color light components output from the light modulation device being provided,
the light sources being able to adjust the emission spectrum of each primary color light component included in the output light within a range of the transmission spectra of the color separation device and the color composite device.

7. A display method for controlling a display device, comprising:
generating and outputting from a plurality of light sources, each light source generating and outputting a different primary color light component, the plurality of light sources capable of adjusting emission spectra of the primary color light components, each of the light sources including a plurality of light-emitting devices respectively, each light-emitting device in one light source having a different emission spectra and being capable of independently adjusting the output therefrom:

modulating by at least one light modulation device the primary color light components output from the light sources;

outputting, from an image analysis device, a light control signal that adjusts the emission spectra of the primary color light components based on an image signal of a displayed image supplied to the light modulation device; and adjusting by a light controlling device emission spectra of the primary color light components output from the lights sources based on the light control signal.

8. A projector, comprising the display device according to claim 1 and projection device that projects light modulated by the light modulation device.

* * * * *